United States Patent [19]
Benz et al.

[11] Patent Number: 5,645,950
[45] Date of Patent: Jul. 8, 1997

[54] PROCESS FOR SUPPLYING AIR TO A FUEL CELL SYSTEM

[75] Inventors: Uwe Benz, Uhldingen; Wolfram Fleck, Erbach; Gerald Hornburg, Elchingen, all of Germany

[73] Assignee: Daimler-Benz AG, Stuttgart, Germany

[21] Appl. No.: 400,931

[22] Filed: Mar. 9, 1995

Related U.S. Application Data

[62] Division of Ser. No. 257,325, Jun. 7, 1994, Pat. No. 5,434,016.

[30] Foreign Application Priority Data

Jun. 7, 1994 [DE] Germany ............ 43 18 818.4

[51] Int. Cl.⁶ .................................................. H01M 8/04
[52] U.S. Cl. .................................. 429/13; 429/17
[58] Field of Search .................... 429/12, 13, 17, 429/19, 22–25

[56] References Cited

U.S. PATENT DOCUMENTS

| | | | |
|---|---|---|---|
| 3,976,506 | 8/1976 | Liandau ........................ | 429/19 X |
| 3,982,962 | 9/1976 | Bloomfield ..................... | 429/19 |
| 4,622,275 | 11/1986 | Noguchi et al. ................ | 429/19 |
| 4,738,903 | 4/1988 | Garow et al. .................. | 429/17 |
| 4,838,020 | 6/1989 | Fujitsuka ....................... | 429/13 X |
| 5,346,778 | 9/1994 | Ewan et al. .................... | 429/19 |

FOREIGN PATENT DOCUMENTS 4021097 1/1992 Germany.

*Primary Examiner*—Anthony Skapars
*Attorney, Agent, or Firm*—Evenson, McKeown, Edwards & Lenahan, P.L.L.C.

[57] ABSTRACT

A process and an apparatus control output of an air-breathing fuel cell system which consists of an air supply line, a fuel cell, an air exhaust line, and a separate gas supply system for hydrogen gas. To control the fuel cell output, an adjustable rotary speed compressor is located in the air supply line and a variable absorption capacity expander is located in the air exhaust line. The compressor, the expander, and an additional electric motor are positioned on a common shaft. The expander converts the pressure energy contained in the exhaust air into mechanical energy and delivers that energy via the common shaft to the compressor. The air volume flow is controlled by the compressor rotary speed and adjusted to a preset value. A preset working pressure is established in the fuel cell system by adjusting the absorption capacity of the expander.

2 Claims, 1 Drawing Sheet

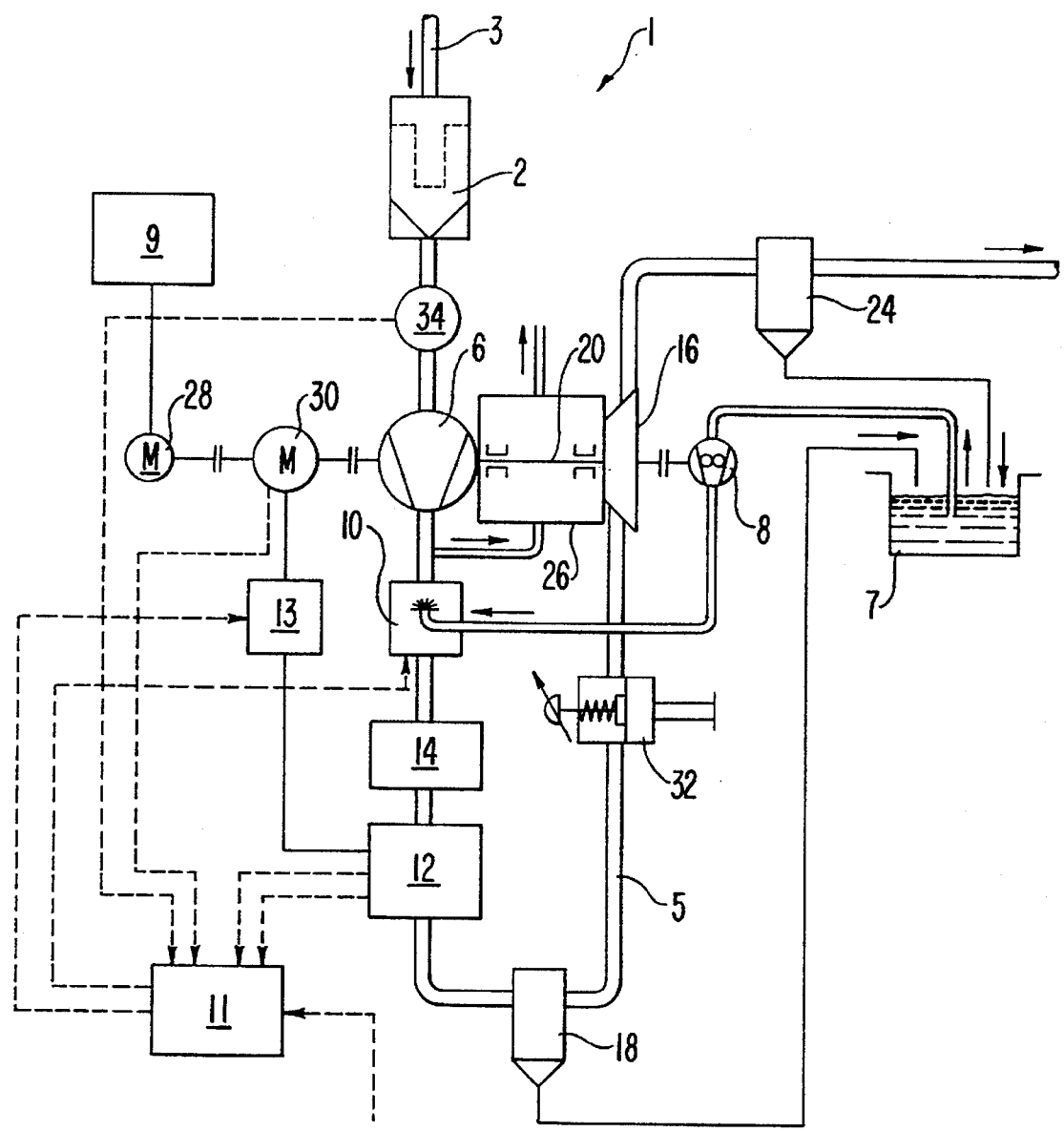

PROCESS FOR SUPPLYING AIR TO A FUEL CELL SYSTEM

This is a divisional application of application Ser. No. 08/257,325, filed Jun. 7, 1994, now U.S. Pat. No. 5,434,016.

CROSS-REFERENCE TO RELATED APPLICATION

This application related to a co-pending application Ser. No. 08/257,328, filed now U.S. Pat. No. 5,432,020, in the name of Uwe Benz et al for PROCESS AND APPARATUS FOR HUMIDIFYING PROCESS GAS FOR OPERATING FUEL CELL SYSTEMS.

BACKGROUND AND SUMMARY OF THE INVENTION

The present invention concerns a process and an apparatus for controlling the output of an air-breathing fuel cell system comprising an air supply line, a variable-speed compressor operatively located in the air supply line leading to the fuel cell, a variable absorption capacity expander operatively located in the air discharge line, and a common shaft operatively associating the compressor and the expander.

German Patent No. 4,021,097 describes a fuel cell system in which the process air is compressed by one or more compressors before entering the fuel cell. After flowing through the fuel cell, the discharged exhaust air is expanded by a turbine so that the energy can be recovered. The turbine, the compressor, and an additional drive motor are positioned on a common shaft. The disadvantage of this known system is that neither the air volume flow nor the working pressure of the process air can be changed independently of each other.

An object of the present invention is to provide a process and apparatus for optimizing the output of the fuel cell system in all operating ranges while the energy required for compressing the air is simultaneously minimized.

This object has been achieved according to the present invention by providing an expander with variable absorption capacity, with the rotary speed of the compressor and the absorption capacity of the expander being preset to desired values by a control device.

By coupling the speed-variable compressor with the variable absorption capacity expander, the fuel cell system can be operated at all times under optimum conditions and, at the same time, the energy required for compressing the air can be reduced. An optimum output of the fuel cell system is achieved when the excess air and the working pressure are at all times optically adjusted to the operating conditions and to the given system configuration. The air volume flow can be controlled by varying the rotary speed of the compressor. Thus, because of the common shaft, the rotary speed of the compressor also determines the rotary speed of the expander. However, it is also possible to control the working pressure by way of the variable absorption capacity of the expander.

A further advantage is obtained by the fact that the residual energy contained in the waste air is converted by the expander into mechanical energy and returned to the compressor via the common shaft. Thus, the energy required by the compressor is reduced.

BRIEF DESCRIPTION OF THE DRAWING

These and other objects, features and advantages of the present invention will become more readily apparent from the following detailed description thereof when taken in conjunction with the accompanying sole FIGURE which is a schematic diagram of the fuel cell system in accordance with the present invention.

DETAILED DESCRIPTION OF THE DRAWING

The fuel cell system, identified generally by reference numeral 1, has a fuel cell 12 or a stack of fuel cells supplied via an air supply line 3 with process air which is discharged via an air discharge line 5 after passing through a conventional cathode chamber (not shown) of the fuel cell 12. The conventional anode chamber (not shown) of the fuel cell 12 is supplied via a second gas supply line with combustible gas such as, for example, hydrogen. Compressor 6 for Compressing the process air is located in the air supply line 3. During the reaction of the hydrogen in the fuel cell 12 with the oxygen that is contained in the process air, not only electrical energy but also product water and heat of reaction are generated. The product water and the heat of reaction are largely discharged from the fuel cell 12 along with the process air. At the same time, as the air volume flow $V_{air}$ leaves the fuel cell 12, it is reduced by the quantity of oxygen consumed.

To recover the pressure energy that is contained in the discharged process air, an expander 16 with a variable absorption capacity is located in the air discharge line 5. The expander 16 is connected to the compressor 6 via a common shaft 20. The common shaft 20 also holds an electric motor 30 in the form of a continuously excited synchronous motor, a starter motor 28 and, optionally, a pump 8. To ensure that, under certain operating conditions, the expander 16 is unable to transmit a negative moment to the compressor 6, an air register 32 is provided between the fuel cell 12 and the expander 16 so as to, at reduced pressure, suck in ambient air. As soon as a working pressure $P_L$ is reached, the expander 16 is allowed to again deliver energy to the compressor 6. In conventional systems, the working pressure $P_L$ is generally set via a pressurizing valve which builds up the working pressure $P_L$ and discharges the waste air to the ambient air after leaving the fuel cell 12. In that conventional process, however, the pressure energy that is supplied at considerable cost to the medium is not utilized but is lost and dissipated outside the system.

The compressor 6 and expander 16 are, according to a presently preferred embodiment, based on the- positive-displacement principle, with the machines used having diaphragm glands and greased roller bearings for the rotor groups. The compressor 6 is a volumetric pump with internal compression to make attainment of the highest efficiency possible. Via gear box case 26, the vapor or odor of grease is discharged directly into the ambient air to avoid contamination of the process air. Thus, no filter stage downstream of compressor 6 is required. Preferably, the expander 16 operates according to the constant-volume principle, but it may also be operated according to the conventional turbine process of polytropic expansion. The compressor 6 and expander 16 are integrated into a common housing, and the starter motor 28 and the electric motor 30 are flange-mounted.

The product water which is contained in the process air after it has passed through fuel cell 12 is separated by one or more liquid separators 18, 24 from the air discharge line 5 and collected in a storage container 7. The water required for humidifying the drawn-in air can subsequently be pumped via pump 8 from the storage container 7 and injected in metered and finely distributed form via injection nozzle 10 into the air supply line 3. The pump 8 may be driven by the common shaft 20 or by a separate motor. The water may be injected either downstream or upstream of compressor 6. The injected water is evaporated by the compressed process air and thus heated air with the result that the process air is humidified by the evaporated water. At the same time, the process air is deprived of energy of evaporation, and this leads to a reduction of the temperature. Thus, by injecting water, the process air is both cooled and humidified, thereby making a separate air humidifier superfluous. Only in fuel cell configurations in which the energy of the compressed process air is not sufficiently high to adequately humidify the entire process air might an additional air humidifier 14 become necessary. In that situation, however, the size of this additional air humidifier 14 will be considerably reduced.

If the water is injected upstream of the compressor, the compressor output is reduced by another 6–8%. In this case, the energy resulting during compression is removed from the gas directly in the form of heat of evaporation while in the case of water injection downstream of the compressor, the gas temperature during polytropic compression is first increased and only subsequently decreased as a result of the fact that the heat of evaporation is removed.

The compressor 6 is driven in part by the energy recovered by the expander 16. In addition, the common shaft 20 also holds a starter motor 28 and another electric motor 30. The starter motor 28 is used especially for mobile applications such as, for example, in automotive vehicles, in which the voltage is supplied via an automotive battery 9, while the electric motor 30 is supplied via current regulator 13 directly by the fuel cell 12. As the fuel cell system 1 is started, the compressor 6 is driven by the starter motor 28 until a minimum air volume flow $V_{min}$ and a minimum working pressure$_{min}$ have been reached in the fuel cell system 1. During this time, the electric motor 30 is deactivated. The minimum air volume flow $V_{min}$ and the minimum working pressure $P_{min}$ are adjusted to values which ensure that the electrical energy produced in the fuel cell 12 is high enough for a self-sufficient operation of the entire fuel cell system 1. After this state of self-sufficient power supply has been reached, the electric motor 30 is activated and the starter motor 28 is switched off. The current regulator 13 between the fuel cell 12 and the electric motor 30 serves to neutralize the current and voltage variations that occur during operation of the fuel cell system 1 and to generate a pulse-width-modulated alternating current.

A control device 11 controls the entire fuel cell system 1. The control parameters made available to the control device 11 are the fuel cell voltage $U_{FC}$, the fuel cell current $I_{FC}$, the rotary speed n of the compressor, and the air volume flow $V_{air}$. The air volume flow $V_{air}$ is determined by a sensor 34 which is located between the air filter 2 and the compressor 6 in the air supply line 3. A desired value for the fuel cell currently $I_{FCdesired}$ is also supplied as an additional input to the control device 11 in which a desired value for the rotary speed of the compressor $n_{desired}$ is determined and fed to the control device 13 to make available the corresponding current value $I_{desired}$.

The control device 11 can also control or regulate the temperature and humidity of the process air. It is, of course, also possible to use a separate control device for this purpose. To implement the control function, the control device 11 determines a desired value for the quantity of injection water required as a function of the relevant operating parameters, and the quantity of water required is injected by triggering the injection nozzle. For the purpose of regulation, it is also necessary to measure the temperature and humidity of the air. The variation of the actual values measured for the temperature or humidity of the process air from the predetermined desired values is controlled by setting the injection quantity to zero. If, in a given system configuration, the amount of energy contained in the compressed process air is not sufficiently high to evaporate the quantity of water required, the temperature is first adjusted via, the quantity of injection water to the predetermined desired value, and the humidity of the air is subsequently adjusted to the predetermined desired value via an additional air humidifier.

The energy expended by the compressor 6 increases in an amount proportional to the square of the pressure (pump lift) and proportional to the mass flow. The compressor output increases with the cube of the-air volume flow $V_{air}$. In addition, the generated fuel cell output increases as the air pressure $P_L$ and the excess air ratio increase while the current load remains the same. To obtain a high efficiency and a high power density in the system, the fuel cell 12 must therefore be operated at the highest possible pressure $p_L$ and with humidified gases. To ensure this operation, the process air provided by the compressor 6 must be generated at the lowest possible expenditure of energy. An optimum power output of the fuel cell system 1 is reached when the excess air and the working pressure $p_L$ are adjusted to the given fuel cell configuration and to the operating conditions. In addition, the compressor 6 must have a high rotary speed spread and a high efficiency throughout the entire speed range.

The fuel cell system 1 is operated with energy savings by constantly adjusting the air volume flow $V_{air}$. According to Faraday's law, the oxygen demand is proportional to the fuel cell current $I_{FC}$ which is reached under certain load requirements. To ensure a safe operation of the fuel cell system 1, on one hand, oxygen must be available in excess quantities. For energy reasons, on the other hand, it is desirable that only as much compressed air as necessary be made available. Therefore, desired values for the air volume flow $C_{desired}$ are stored as a function of the fuel cell current $I_{FC}$ and tie excess oxygen factor required in a performance chart. During operation, the fuel cell current $I_{FC}$ is measured and, based on the performance chart, a desired value is determined for the air volume flow $V_{desired}$. In addition, the actual value of the air volume flow $V_{actual}$ is determined by the sensor 34. The variation of these two values is subsequently entered by the current regulator 13 into a speed control device for the electric motor 30.

To ensure that the output of the fuel cell system 1 can be varied without high efficiency losses, a compressor drive is required to provide an excellent speed control and to ensure a high degree of efficiency. For this purpose, a continuously excitable synchronous motor is preferably used.

The above-described process and apparatus are especially suitable for, but not limited to, use in fuel cell systems with proton-conducting electrolyte membranes (PEM technology). They can also be used in mobile and stationary fuel cell systems, for example, in automotive vehicles and train systems and for a decentralized power supply system.

Due to the low moments of inertia of the entire air supply unit resulting from compact design of the electric motor, the compressor and the expander, and the high speed with which the number of revolutions of the electric motor can be changed, it is possible to achieve short response times. This results in a highly dynamic air supply. The starting times are in a range from 5 to 100 ms. These dynamics make it possible to use the air supply unit even in highly and rapidly varying current-generating systems, such as required by automotive vehicles.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A process for operating an apparatus controlling output of an air-breathing fuel cell system, comprising the steps of determining, based on measured fuel cell current, a desired value for air volume flow, regulating an actual value of the air volume flow by adjusting rotary speed of a compressor to the desired value, and adjusting pressure in a cathode space of the fuel cell to a predetermined working pressure by adjusting an expander absorption capacity.

2. The process according to claim 1, wherein, as the fuel cell system is started, the compressor is driven by a starter motor until a minimum air volume flow and a minimum working pressure are obtained, and subsequently the starter motor is deactivated after an electric motor is activated.

* * * * *